US009736692B2

(12) United States Patent
Lundqvist et al.

(10) Patent No.: US 9,736,692 B2
(45) Date of Patent: *Aug. 15, 2017

(54) SECURITY TECHNIQUES FOR RECONNECTING TO A CONFERENCE SESSION USING A COMPUTING DEVICE

(71) Applicant: Google Inc., Mountain View, CA (US)

(72) Inventors: Jan Tomas Lundqvist, Segeltorp (SE); Jonas Erik Lindberg, Stockholm (SE); Sailesh Nepal, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/289,533

(22) Filed: Oct. 10, 2016

(65) Prior Publication Data

US 2017/0026839 A1    Jan. 26, 2017

Related U.S. Application Data

(63) Continuation of application No. 14/596,314, filed on Jan. 14, 2015, now Pat. No. 9,467,854.

(51) Int. Cl.
*H04M 1/66* (2006.01)
*H04M 1/68* (2006.01)
(Continued)

(52) U.S. Cl.
CPC ......... *H04W 12/06* (2013.01); *H04L 63/0876* (2013.01); *H04M 1/72563* (2013.01);
(Continued)

(58) Field of Classification Search
CPC ......... H04W 12/06; H04W 8/26; H04W 4/06; H04M 3/567; H04M 3/42059; H04M 1/72563
See application file for complete search history.

(56) References Cited

U.S. PATENT DOCUMENTS 5,828,743 A * 10/1998 Pinnell ............... H04M 3/56
                                                                    370/261
6,836,287 B1 * 12/2004 Nakahara .......... H04N 5/23203
                                                                    348/211.12
(Continued)

FOREIGN PATENT DOCUMENTS

EP        2618623 A1    7/2013

OTHER PUBLICATIONS

PCT International Search Report and Written Opinion dated Apr. 26, 2016 for PCT International Application No. PCT/US2016/013035, 11 pages.

*Primary Examiner* — Erin File
(74) *Attorney, Agent, or Firm* — Remarck Law Group PLC

(57) ABSTRACT

A computer-implemented technique can include joining, by a computing device having one or more processors, a conference session hosted by a server via a wireless computing network. In response to joining the conference session, the computing device can receive, from the server via the wireless computing network, a dial-in telephone number for reconnecting to the conference session. The computing device can detect a trigger condition indicative of a need to reconnect to the conference session via a cellular telephone network. In response to detecting the trigger condition, the computing device can initiate a telephone call to the dial-in telephone number via the cellular telephone network. In response to the server obtaining authentication of a caller identification of the computing device, the computing device can rejoin the conference session via the cellular telephone network.

20 Claims, 2 Drawing Sheets

(51) Int. Cl.
  *H04M 3/16* (2006.01)
  *H04W 12/06* (2009.01)
  *H04M 1/725* (2006.01)
  *H04M 3/42* (2006.01)
  *H04M 3/56* (2006.01)
  *H04W 4/06* (2009.01)
  *H04W 8/26* (2009.01)
  *H04L 29/06* (2006.01)
  *H04W 4/16* (2009.01)

(52) U.S. Cl.
  CPC ......... *H04M 3/42059* (2013.01); *H04M 3/56* (2013.01); *H04M 3/567* (2013.01); *H04W 4/06* (2013.01); *H04W 4/16* (2013.01); *H04W 8/26* (2013.01); *H04M 2201/14* (2013.01); *H04M 2203/152* (2013.01); *H04M 2203/2088* (2013.01); *H04M 2207/18* (2013.01)

(56) References Cited

U.S. PATENT DOCUMENTS

| | | | |
|---|---|---|---|
| 7,228,145 B2 | 6/2007 | Burritt et al. | |
| 7,469,043 B1* | 12/2008 | McDonald | H04L 29/12103 370/260 |
| 7,539,492 B2* | 5/2009 | Jagadeesan | H04W 36/14 370/331 |
| 8,238,537 B2 | 8/2012 | Gisby et al. | |
| 8,401,545 B2 | 3/2013 | Tal et al. | |
| 8,464,336 B2 | 6/2013 | Wei et al. | |
| 8,744,054 B2 | 6/2014 | Dufrene et al. | |
| 9,225,839 B2* | 12/2015 | Gisby | H04M 3/56 |
| 9,462,112 B2* | 10/2016 | Woolsey | G06F 17/289 |
| 2004/0042438 A1* | 3/2004 | Jiang | H04W 84/08 370/342 |
| 2004/0081136 A1* | 4/2004 | Brown | H04L 12/1831 370/352 |
| 2004/0082352 A1* | 4/2004 | Keating | H04W 4/08 455/519 |
| 2004/0203621 A1* | 10/2004 | Brown | H04M 3/42221 455/412.1 |
| 2004/0253961 A1* | 12/2004 | Kong | H04W 76/02 455/450 |
| 2005/0182943 A1* | 8/2005 | Calin | H04W 12/06 713/182 |
| 2005/0233736 A1* | 10/2005 | Berstis | H04L 12/1831 455/416 |
| 2005/0260976 A1* | 11/2005 | Khartabil | H04M 3/56 455/416 |
| 2006/0128388 A1* | 6/2006 | Mason | H04M 3/424 455/445 |
| 2006/0230106 A1* | 10/2006 | McDonald, Jr. | H04L 67/34 709/204 |
| 2008/0037576 A1* | 2/2008 | Hwang | H04L 12/1895 370/432 |
| 2008/0069328 A1* | 3/2008 | Bostick | H04M 3/56 379/202.01 |
| 2008/0205616 A1* | 8/2008 | Teng | G06Q 10/109 379/202.01 |
| 2008/0311945 A1* | 12/2008 | Balo | H04W 72/005 455/518 |
| 2009/0097628 A1* | 4/2009 | Yap | H04M 3/50 379/202.01 |
| 2009/0116443 A1 | 5/2009 | Walker et al. | |
| 2009/0149167 A1* | 6/2009 | Patel | H04W 76/002 455/416 |
| 2009/0323655 A1* | 12/2009 | Cardona | H04M 3/56 370/338 |
| 2010/0220846 A1* | 9/2010 | Gisby | H04M 3/56 379/202.01 |
| 2010/0316207 A1* | 12/2010 | Brunson | H04M 3/56 379/202.01 |
| 2011/0183659 A1* | 7/2011 | Ayyasamy | H04L 12/66 455/419 |
| 2012/0033658 A1 | 2/2012 | Ganesan | |
| 2012/0115448 A1* | 5/2012 | Rosenhaft | G06Q 10/087 455/414.1 |
| 2012/0128146 A1* | 5/2012 | Boss | H04M 3/56 379/202.01 |
| 2012/0263287 A1 | 10/2012 | Gisby et al. | |
| 2013/0268598 A1 | 10/2013 | Tipirneni | |
| 2014/0226536 A1* | 8/2014 | Whitney | H04M 3/56 370/260 |
| 2015/0056970 A1* | 2/2015 | Barrett | H04M 3/56 455/416 |
| 2016/0227588 A1* | 8/2016 | Patel | H04W 76/005 |

* cited by examiner

SECURITY TECHNIQUES FOR RECONNECTING TO A CONFERENCE SESSION USING A COMPUTING DEVICE

CROSS-REFERENCE TO RELATED APPLICATIONS

This application is a continuation of U.S. patent application Ser. No. 14/596,314, filed Jan. 14, 2015. The entire disclosure of the above application is incorporated herein by reference.

FIELD

The present disclosure generally relates to conference sessions and, more particularly, to security techniques for reconnecting to a conference session using a computing device.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Conference sessions can include video conference sessions (with audio) and audio-only conference sessions. Each user can join a conference session by connecting their computing device to a server, e.g., via a computing network. Once each computing device is connected to the server, the users can communicate with each other. When a computing device experiences a loss of signal at the computing network, however, its connection to the server can be interrupted or terminated, thereby dropping the user from the conference session. Reestablishing the connection between the computing device and the server to allow the user to rejoin the conference session can be difficult and prone to security issues, such as an impostor using their computing device to join the conference session and assume the dropped user's identity.

SUMMARY

A computer-implemented technique is presented. The technique can include joining, by a computing device having one or more processors, a conference session hosted by a server via a wireless computing network, wherein joining the conference session causes the server to select from a predetermined collection of dial-in telephone numbers for reconnecting to the conference session, the selected dial-in telephone number being a single-use dial-in telephone number that is only valid for one reconnection to the conference session. The technique can include in response to joining the conference session, receiving, at the computing device from the server via the wireless computing network, the selected dial-in telephone number. The technique can include detecting, by the computing device, a trigger condition indicative of a need to reconnect to the conference session via a cellular telephone network, the trigger condition being one of: (i) a substantial decrease in a signal strength of the wireless computing network compared to a signal strength of the cellular telephone network, (ii) the computing device losing or dropping its connection with the server via the wireless computing network, and (iii) a manual input by a user of the computing device. The technique can include in response to detecting the trigger condition, transmitting, by the computing device, a ping to the server, wherein the ping is a signal or identifier of the computing device that causes the server to initiate a defined time window during which rejoining of the conference session using the selected dial-in telephone number is permitted. The technique can include in response to detecting the trigger condition, initiating, by the computing device, a telephone call to the selected dial-in telephone number via the cellular telephone network, wherein receipt of the telephone call to the selected dial-in telephone number during the defined time window causes the server to: (i) automatically authenticate a caller identification of the computing device when the cellular telephone network is operated by a carrier that is integrated with the server, or (ii) obtain authentication of a caller identification of the computing device from a third party authentication service when the carrier is not integrated with the server. The technique can include in response to the server obtaining the caller identification authentication, rejoining, by the computing device, the conference session via the cellular telephone network. The technique can also include after rejoining the conference session and in response to an explicit request from the user, obtaining, by the computing device from the server, a new dial-in telephone number from the predetermined collection of telephone numbers for reconnecting to the conference session.

Another computer-implemented technique is also presented. The technique can include joining, by a computing device having one or more processors, a conference session hosted by a server via a wireless computing network. The technique can include in response to joining the conference session, receiving, at the computing device from the server via the wireless computing network, a dial-in telephone number for reconnecting to the conference session. The technique can include detecting, by the computing device, a trigger condition indicative of a need to reconnect to the conference session via a cellular telephone network. The technique can include in response to detecting the trigger condition, initiating, by the computing device, a telephone call to the dial-in telephone number via the cellular telephone network. The technique can also include in response to the server obtaining authentication of a caller identification of the computing device, rejoining, by the computing device, the conference session via the cellular telephone network.

In some implementations, when the cellular telephone network is operated by a carrier that is integrated with the server, the call by the computing device to the dial-in telephone number causes the server to automatically authenticate the caller identification of the computing device. In other implementations, when the cellular telephone network is operated by a carrier that is not integrated with the server, the call by the computing device to the dial-in telephone number causes the server to obtain authentication of the caller identification of the computing device from a third-party authentication service.

In some implementations, the techniques further include in response to detecting the trigger condition, transmitting, by the computing device to the server, a ping, wherein the ping is a signal or identifier of the computing device that causes the server to initiate a defined time window during which rejoining of the conference session using the dial-in telephone number is permitted.

In some implementations, the dial-in telephone number is selected from a predetermined collection of telephone numbers. In some implementations, the dial-in telephone number is a single-use dial-in telephone number that, in response to the computing device rejoining the conference session, is no longer valid for reconnecting to the conference session. In some implementations, the technique further includes after the computing device has rejoined the conference session via the cellular network: receiving, at the computing device, an explicit request for a new dial-in telephone number for reconnecting to the conference session, transmitting, at the computing device to the server, the explicit request, wherein receipt of the explicit request causes the server to select another one of the predetermined collection of telephone numbers to obtain the new dial-in telephone number, and receiving, at the computing device from the server, the new dial-in telephone number.

In some implementations, the trigger condition includes a signal strength of the cellular telephone network being substantially greater than a signal strength of the wireless computing network. In other implementations, the trigger condition includes the computing device losing or dropping its connection to the wireless computing network. In other implementations, the trigger condition includes at least one of audio and video quality at the computing device decreasing below a user-defined or predetermined threshold. In yet other implementations, the trigger condition includes a manual input by a user of the computing device.

A computing device having one or more processors configured to perform operations is also presented. The operations can include joining a conference session hosted by a server via a wireless computing network. The operations can include in response to joining the conference session, receiving, from the server via the wireless computing network, a dial-in telephone number for reconnecting to the conference session. The operations can include detecting a trigger condition indicative of a need to reconnect to the conference session via a cellular telephone network. The operations can include in response to detecting the trigger condition, initiating a telephone call to the dial-in telephone number via the cellular telephone network. The operations can also include in response to the server obtaining authentication of a caller identification of the computing device, rejoining the conference session via the cellular telephone network.

In some implementations, when the cellular telephone network is operated by a carrier that is integrated with the server, the call by the computing device to the dial-in telephone number causes the server to automatically authenticate the caller identification of the computing device. In other implementations, when the cellular telephone network is operated by a carrier that is not integrated with the server, the call by the computing device to the dial-in telephone number causes the server to obtain authentication of the caller identification of the computing device from a third-party authentication service.

In some implementations, the operations further include in response to detecting the trigger condition, transmitting a ping to the server, wherein the ping is a signal or identifier of the computing device that causes the server to initiate a defined time window during which rejoining of the conference session using the dial-in telephone number is permitted.

In some implementations, the dial-in telephone number is selected from a predetermined collection of telephone numbers, and wherein the dial-in telephone number is a single-use dial-in telephone number that, in response to the computing device rejoining the conference session, is no longer valid for reconnecting to the conference session. In some implementations, the operations further include after the computing device has rejoined the conference session via the cellular network: receiving an explicit request for a new dial-in telephone number for reconnecting to the conference session, transmitting, to the server, the explicit request, wherein receipt of the explicit request causes the server to select another one of the predetermined collection of telephone numbers to obtain the new dial-in telephone number, and receiving, from the server, the new dial-in telephone number.

In some implementations, the trigger condition includes a signal strength of the cellular telephone network being substantially greater than a signal strength of the wireless computing network. In other implementations, the trigger condition includes the computing device losing or dropping its connection to the wireless computing network. In other implementations, the trigger condition includes at least one of audio and video quality at the computing device decreasing below a user-defined or predetermined threshold. In yet other implementations, the trigger condition includes a manual input by a user of the computing device.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
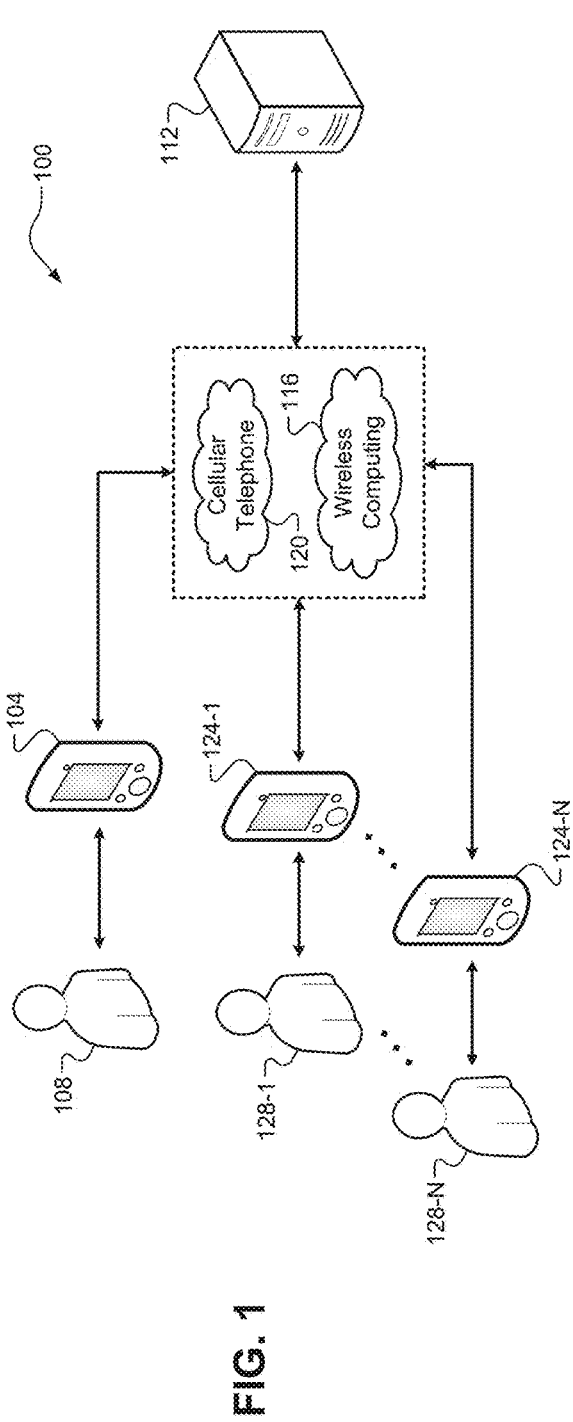
FIG. 1 is a diagram of a computing network including an example computing device according to some implementations of the present disclosure.

To avoid cellular data fees, a user may connect their computing device to a conference session using a wireless computing network (e.g., WiFi), which is typically much cheaper than cellular data via a cellular telephone network. When the wireless signal on their computing device is weak, the user may be dropped from the conference session. In these cases, the user could then dial into the conference session with their computing device via the cellular network. This reconnection could dismiss the previous instance of the user from the conference session. As previously discussed, however, this reconnection process may be susceptible to impostors, such as hackers that guess the dial-in telephone number to then dismiss the user from the conference session. This could be particularly problematic for secure conference sessions, such as a conference session between a user and his/her bank. Additional pin numbers for the users could be implemented, but these can be time consuming and frustrating for the user.

Accordingly, security techniques are presented for dialing into a conference session using a computing device (e.g., a mobile phone). The benefits of these security techniques can include increased conference session security and thus an improved, less stressful user experience. When a user initially joins a conference session, their computing device can be automatically provided with a dial-in telephone number randomly selected from a pool of dial-in telephone numbers. This dial-in telephone number may be provided to and utilized by their computing device without their knowledge. Various different triggers could cause the computing device to automatically dial-in using the provided dial-in telephone number. One trigger can be when the computing device is connected to the conference session via wireless computing network and the computing device's cellular telephone network signal is substantially better than its wireless computing network signal. While connection to a cellular telephone network is discussed herein, it will be appreciated that the computing device could alternatively reconnect via another suitable computing network (e.g., a different WiFi network that is now in-range, whereas the previous WiFi network is not out-of-range).

Another trigger could be when the computing device loses its connection (wireless computing or cellular telephone) to the conference session. Another trigger could be when at least one of audio and video quality at the computing device decreasing below a user-defined or predetermined threshold. This drop in audio and/or video quality may be an appropriate instance to reconnect (e.g., based on user preferences) while operating differently than the connection quality reconnection trigger. Yet another trigger could be a manual trigger, such as when the user manually inputs a request to dial-in to the conference session using the provided dial-in telephone number. When dialing in, a server can authenticate the computing device using the dial-in telephone number as well as caller identification. Authentication could alternatively occur when the user initially joins the conference session. Some carriers/providers of cellular telephone network service have carrier integration with the server and thus their caller identification is considered trustable. Other carriers/providers may not be integrated and thus the caller identification could be spoofable (e.g., by hackers/imposters) and thus their caller identification is not considered to be trustable. For these carriers, third-party service caller identification authentication could be implemented.

In one implementation, before the dial-in is to occur, the computing device can ping the server to initiate a defined time window during which the dial-in call is allowed (e.g., a few seconds). The term "ping" as used herein can refer to any suitable signal or identifier transmitted from the computing device to the server. A dial-in before or after this defined time window could be rejected. In some implementations, the dial-in telephone number is a unique, single-use dial-in telephone number. Thus, subsequent attempts to use the dial-in telephone number would be rejected. After dialing in, the user could explicitly request another dial-in telephone number, in the event she/he gets disconnected again. These techniques are also applicable to wireless calling, where the user initiates a phone call via a wireless network (WiFi, etc.) to save money on cellular fees. If the wireless signal is weak and the cellular signal is strong (e.g., the user leaves their house and goes to his/her car parked in the street), however, the computing device could automatically dial-in to the call, thereby providing a seamless transition that could be undetectable by any call participants. Another benefit of the techniques of the present disclosure with respect to wireless calling is decreased cellular data fees for the user.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how and whether information is collected about the user and used by a content server.

Referring now to FIG. 1, a diagram of a computing network 100 is illustrated. The computing network 100 can include an example computing device 104 according to some implementations of the present disclosure. In one implementation, the computing device 104 is a mobile phone. The computing device 104, however, can also be any other suitable computing device that can communicate via both computing and cellular telephone networks, such as a desktop/laptop/tablet computers and wearable computing devices, such as computing eyewear or a smartwatch. The computing device 104 can be operated by a user 108.

The computing device 104 can communicate with a server 112 via a wireless computing network 116 or a cellular telephone network 120. The term "wireless computing network" as used herein can refer to any computing network that is entirely distinct from (e.g., does not involve communication via) the cellular telephone network 120. In one implementation, the wireless computing network 116 is a WiFi computing network. Other suitable networks, such as Bluetooth, WiFi Direct, or another suitable short-range wireless communication medium, may also be utilized. Each network 116, 120 can involve a local area network (LAN), a wide area network (WAN), e.g., the Internet, or a combination thereof.

The server 112 can be configured to host a conference session between the computing device 104 and at least one other computing device 124-1 ... 124-N (N>0, collectively "other computing devices 124") associated with other respective users 128-1 ... 128-N (N>0, collectively "other users 128"). In one implementation, the conference session is a telephone call (a two-way call, a three way call, etc.), but the conference session could also be a video conference or other suitable chat session. For example only, the other computing devices 124 may also be mobile phones. The term "server" as used herein can refer to both a single hardware computer server and a plurality of hardware computer servers operating in a parallel or distributed architecture. It should also be appreciated that the server 112 may only handle the security techniques of the present disclosure, which are discussed in greater detail below, while a different server may actually host the conference session.

Figure 2:
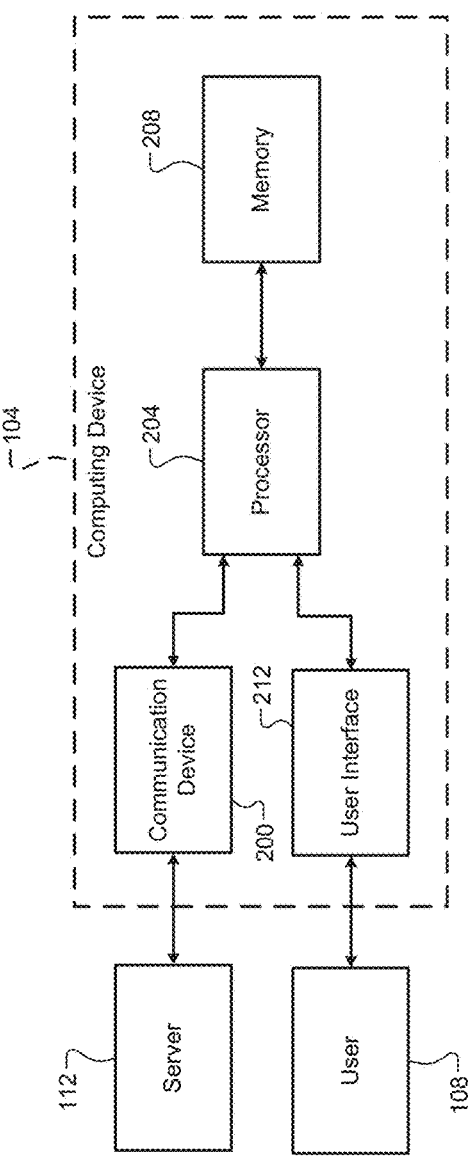
FIG. 2 is a functional block diagram of the example computing device of FIG. 1.

Referring now to FIG. 2, a functional block diagram of the computing device 104 is illustrated. It should be appreciated that the server 112 can have the same or similar structure as the computing device 104. The computing device 104 can include a communication device 200, a processor 204, a memory 208, and a user interface 212. The term "processor" as used herein can refer to both a single processor and multiple processors operating in a parallel or distributed architecture. The communication device 200 can include any suitable communication components (e.g., a transceiver) for communication via the networks 116, 120. The memory 208 can be any suitable storage medium (flash, hard disk, etc.) for storing information at the computing device 104. The user interface 212 can include any suitable components (display or touch display, keyboard, etc.) for communicating with the user 108. The processor 204 can control operation of the computing device 104 and can implement at least a portion of the security techniques, which are described in greater detail below.

The computing device 104 can joining a conference session via the wireless computing network 116. The conference session can be hosted by the server 112 or another suitable server. In response to joining the conference session, the computing device 104 can receive, from the server 112 via the wireless computing network 116, a dial-in telephone number for reconnecting to the conference session. In one implementation, the dial-in telephone number can be selected from a predetermined collection of telephone numbers. For example only, the predetermined collection of telephone numbers may include approximately 5000 telephone numbers. In one implementation, the dial-in telephone number is a single-use dial-in telephone number that can only be used once to reconnect to the conference session. After this single use, any subsequent reconnection attempts can be rejected or otherwise not permitted by the server 112.

After receiving the dial-in telephone number, the computing device 104 can detect a trigger condition indicative of a need to reconnect to the conference session via the cellular telephone network 120. Examples of the trigger condition include, but are not limited to, (i) a signal strength of the cellular telephone network 120 being substantially greater than a signal strength of the wireless computing network 116, (ii) the computing device 104 losing or dropping its connection to the wireless computing network 116, (iii) at least one of audio and video quality at the computing device decreasing below a user-defined or predetermined threshold, and (iv) a manual input by the user 108 of the computing device 104, such as via the user interface 212.

For example only, signal strength thresholds can be implemented to determine whether the signal strength of the wireless computing network 116 is too weak. In the case of the signal strength of the cellular telephone network 120 being substantially greater than the signal strength of the wireless computing network 116, a comparison can be made between a different between the signal strengths and a threshold. Other suitable trigger conditions can also be implemented, such as a user defined trigger condition involving their calendar/schedule, the time of day, and/or the computing device's geo-location. Various combinations of these trigger conditions can also be utilized to vary reconnection sensitivity, such as based on the preference or settings of the user 108.

In some implementations, in response to detecting the trigger condition, the computing device 104 can ping the server 112. This ping can cause the server 112 to initiate a defined time window (e.g., 15 seconds) during which a reconnection to the conference session using the dial-in telephone number is permitted. A reconnection attempt within this defined time window can be permitted, whereas a reconnection attempt outside of this defined time window (before the ping or after the expiration of the defined time window) can be rejected or otherwise not permitted. This can provide an additional layer of security to prevent hackers or other unauthorized individuals from quickly dialing-in to the conference session using the dial-in telephone number before the computing device 104 attempts to do so.

In response to detecting the trigger condition, the computing device 104 can initiate a telephone call to the dial-in telephone number via the cellular telephone network 120. The server 112 can obtain authentication of the caller identification ("caller ID") of the computing device 104 in order to permit reconnection to the conference session. Alternatively, this caller ID authentication could be performed when the computing device 104 initially joins the conference session. When a carrier or provider of the cellular telephone network 120 is integrated with the server 112, the server 104 can assume the caller ID to be authentic and can automatically authenticate the caller ID of the computing device 104. When the carrier is not integrated with the server 112, however, the server 112 can utilize a third-party authentication service provider to obtain authentication of the caller ID of the computing device 104.

In response to the server obtaining authentication of a caller identification of the computing device 104 can rejoin the conference session via the cellular telephone network 120. Upon or after rejoining the conference session and when the dial-in number is a single-use dial-in telephone number, the user 108 may input or otherwise provide an explicit request to the computing device 104 for a new dial-in telephone number. This explicit request can be transmitted from the computing device 104 to the server 112. Receipt of the explicit request can cause the server 112 to obtain a new dial-in telephone number, e.g., from the predetermined collection of telephone numbers. In one implementation, this new dial-in telephone number may also be a single-use dial-in telephone number. The server 112 can then return the new dial-in telephone number to the computing device 104.

As previously discussed, all or a majority of these operations can be performed without knowledge of the user 108. By doing so, the reconnection to the conference session via a different network is seamless and possible unbeknownst to the user 108. The process is also automated, and requires no further user intervention, such as manually dialing the dial-in number after notifying a weak or lost connection. The lack of visibility and possible single-use of these dial-in numbers can also aid in maintaining the improved security of these techniques.

Figure 3:
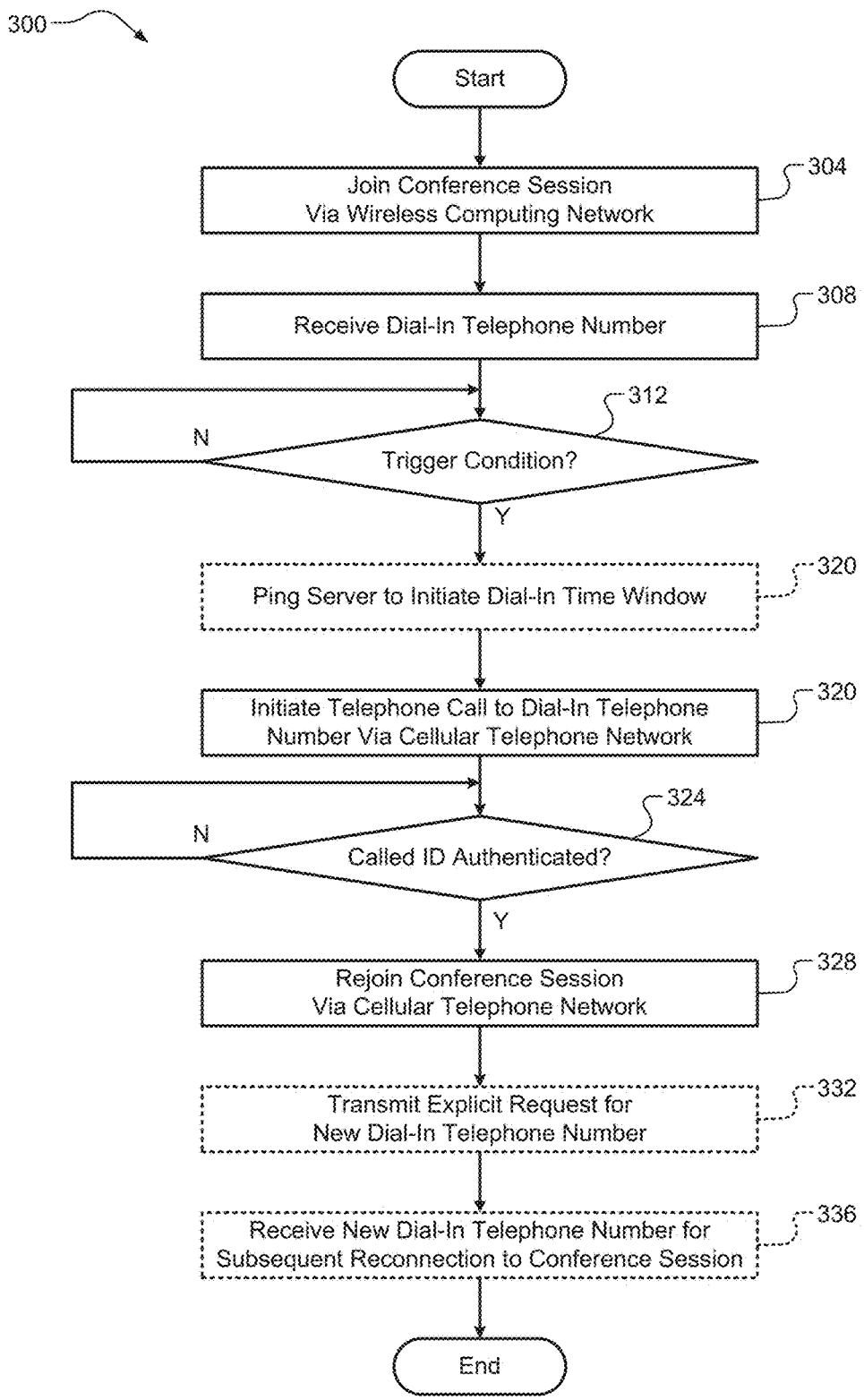
FIG. 3 is a flow diagram of an example security technique for dialing into a conference session using a computing device.

Referring now to FIG. 3, a flow diagram of an example security technique 300 ("technique 300") for dialing into a conference session using a computing device, e.g., computing device 104. At 304, the computing device 104 can join a conference session hosted by the server 112 via the wireless computing network 116. For example, this joining may be in response to a request by the computing device 104 or in response to an acceptance of the request by another computing device. At 308, the computing device 104 can receive, from the server 112 via the wireless computing network 116, a dial-in telephone number for reconnecting to the conference session. At 312, the computing device 104 can detect a trigger condition indicative of a need to reconnect to the conference session via the cellular telephone network 120. When the trigger condition is detected, the technique 300 can proceed to 316. When no trigger condition is detected, the technique 300 can end or return to 312. At 316, the computing device 104 can optionally ping the server 112 to initiate the dial-in time window during which reconnection using the dial-in telephone number can occur. At 320, the computing device 104 can initiate a telephone call to the dial-in telephone number via the cellular telephone network 120.

At 324, a determination is made by the server 112 regarding whether the caller identification of the computing device 104 is authenticated. When the caller identification has been authenticated by the server 112, the technique 300 can proceed to 328. When the caller identification has not been authenticated, the technique 300 can end or return to 324 or, if the dial-in time window has expired, the technique 300 can end. At 328, the computing device 104 can rejoin the conference session via the cellular telephone network 120. In some implementations, the dial-in telephone number is a single-use dial in telephone number. The technique 300 may then end. In such implementations, the computing device 104 can optionally transmit an explicit request at 332 (e.g., in response to a manual request from the user 108) to the server 112, which can cause the server to obtain a new dial-in telephone number. At optional 336, the computing device 104 can then receive the new dial-in telephone number, which could be used for subsequent reconnections, if necessary. The technique 300 could then return to 312 for one or more additional cycles.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC), an electronic circuit; a combinational logic circuit; a field programmable gate array (FPGA), a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
    establishing, by a server computing device via a wireless computing network, a conference session;
    allowing, by the server computing device, a client computing device to join the conference session via the wireless computing network;
    transmitting, by the server computing device and to the client computing device via the wireless computing network, a dial-in telephone number for reconnecting to the conference session;
    receiving, by the server computing device and from the client computing device, a signal or identifier of the client computing device;
    in response to receiving the signal or identifier, initiating, by the server computing device, a defined time window during which rejoining of the conference session using the dial-in telephone number is permitted;
    detecting, by the server computing device, a telephone call by the client computing device to the dial-in telephone number via a cellular telephone network;
    when the telephone call is detected within the defined time window, allowing, by the server computing device, the client computing device to rejoin the conference session via the cellular telephone network; and
    not allowing, by the server computing device, the client computing device to rejoin the conference session via the cellular telephone network when (i) the telephone call is detected before the defined time window or (ii) the telephone call is detected after the defined time window.

2. The method of claim 1, further comprising obtaining, by the server computing device, authentication of a caller identification of the client computing device prior to allowing the client computing device to rejoin the conference session via the cellular telephone network.

3. The method of claim 2, wherein a carrier of the cellular telephone network is integrated with the server computing device, and wherein the server computing device authenticates the caller identification.

4. The method of claim 2, wherein a carrier of the cellular telephone network is not integrated with the server computing device, and wherein the server computing device obtains the caller identification authentication from a third-party authentication service.

5. The method of claim 1, further comprising after the client computing device has rejoined the conference session via the cellular telephone network:
    receiving, by the server computing device and from the client computing device, a request for a new dial-in telephone number for reconnecting to the conference session; and
    transmitting, by the server computing device and to the client computing device, the new dial-in telephone number.

6. The method of claim 5, wherein the dial-in telephone number and the new dial-in telephone number are each selected by the server computing device from a predetermined collection of telephone numbers.

7. The method of claim 6, wherein the dial-in telephone number is a single-use dial-in telephone number that, after the client computing device rejoins the conference session, is no longer valid for reconnecting to the conference session.

8. A computer-implemented method, comprising:
    establishing, by a server computing device via a wireless computing network, a conference session;
    allowing, by the server computing device, a client computing device to join the conference session via the wireless computing network;
    obtaining, by the server computing device, a dial-in telephone number for reconnecting to the conference session, the dial-in telephone number being a single-use dial-in telephone number that is only valid for reconnecting to the conference session one time;
    transmitting, by the server computing device and to the client computing device via the wireless computing network, the dial-in telephone number;
    detecting, by the server computing device, a telephone call by the client computing device to the dial-in telephone number via a cellular telephone network; and
    in response to detecting the telephone call, allowing, by the server computing device, the client computing device to rejoin the conference session via the cellular telephone network.

9. The method of claim 8, further comprising:
    receiving, by the server computing device and from the client computing device, a signal or identifier of the client computing device; and
    in response to receiving the signal or identifier, initiating, by the server computing device, a defined time window during which rejoining of the conference session using the dial-in telephone number is permitted.

10. The method of claim 9, further comprising:
    when the telephone call is detected within the defined time window, allowing, by the server computing device, the client computing device to rejoin the conference session via the cellular telephone network; and
    when the telephone call is detected outside of the defined time window, not allowing, by the server computing device, the client computing device to rejoin the conference session via the cellular telephone network.

11. The method of claim 8, further comprising obtaining, by the server computing device, authentication of a caller identification of the client computing device prior to allowing the client computing device to rejoin the conference session via the cellular telephone network.

12. The method of claim 11, wherein a carrier of the cellular telephone network is integrated with the server computing device, and wherein the server computing device authenticates the caller identification.

13. The method of claim 11, wherein a carrier of the cellular telephone network is not integrated with the server computing device, and wherein the server computing device obtains the caller identification authentication from a third-party authentication service.

14. The method of claim 8, wherein obtaining the dial-in telephone number includes selecting, by the server computing device, the dial-in telephone number from a predetermined collection of telephone numbers.

15. The method of claim 14, further comprising after the client computing device has rejoined the conference session via the cellular telephone network:
receiving, by the server computing device and from the client computing device, a request for a new dial-in telephone number for reconnecting to the conference session;
selecting, by the server computing device, the new dial-in telephone number from the predetermined collection of telephone numbers; and
transmitting, by the server computing device and to the client computing device, the new dial-in telephone number.

16. A computer-implemented method, comprising:
establishing, by a server computing device via a wireless computing network, a conference session;
allowing, by the server computing device, a client computing device to join the conference session via the wireless computing network;
transmitting, by the server computing device and to the client computing device via the wireless computing network, a dial-in telephone number for reconnecting to the conference session;
detecting, by the server computing device, a telephone call by the client computing device to the dial-in telephone number via a cellular telephone network;
determining, by the server computing device, whether the cellular telephone network is operated by a carrier that is integrated with the server computing device;
when the carrier is integrated with the server computing device, authenticating, by the server computing device, a caller identification of the client computing device;
when the carrier is not integrated with the server computing device, obtaining, by the server computing device and from a third-party authentication service, authentication of the caller identification of the client computing device; and
in response to the caller identification being authenticated, allowing, by the server computing device, the client computing device to rejoin the conference session via the cellular telephone network.

17. The method of claim 16, further comprising:
receiving, by the server computing device and from the client computing device, a signal or identifier of the client computing device; and
in response to receiving the signal or identifier, initiating, by the server computing device, a defined time window during which rejoining of the conference session using the dial-in telephone number is permitted.

18. The method of claim 17, further comprising:
when the telephone call is detected within the defined time window, allowing, by the server computing device, the client computing device to rejoin the conference session via the cellular telephone network; and
when the telephone call is detected outside of the defined time window, not allowing, by the server computing device, the client computing device to rejoin the conference session via the cellular telephone network.

19. The method of claim 16, further comprising selecting, by the server computing device, the dial-in telephone number from a predetermined collection of telephone numbers, wherein the dial-in telephone number is a single-use dial-in telephone number that, after the client computing device rejoins the conference session, is no longer valid for reconnecting to the conference session.

20. The method of claim 19, further comprising after the client computing device has rejoined the conference session via the cellular telephone network:
receiving, by the server computing device and from the client computing device, a request for a new dial-in telephone number for reconnecting to the conference session;
selecting, by the server computing device, the new dial-in telephone number from the predetermined collection of telephone numbers; and
transmitting, by the server computing device and to the client computing device, the new dial-in telephone number.

* * * * *